Figure 1:
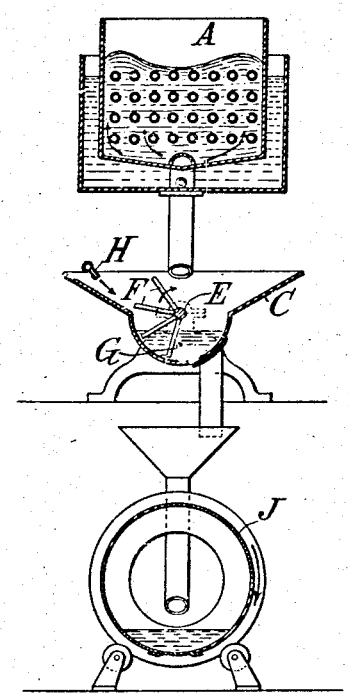
Figure 1:
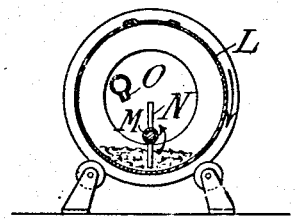
Figure 1:
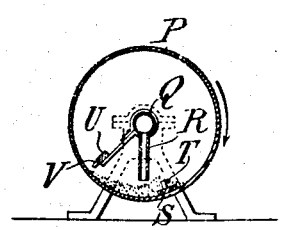

No. 762,277. PATENTED JUNE 14, 1904.
C. H. CAMPBELL.
FOOD PRODUCT.
APPLICATION FILED MAR. 11, 1902.
NO MODEL.

WITNESSES:
Fred White
René Bruine

INVENTOR
Charles H. Campbell,
By Attorneys,
Arthur C. Fraser

No. 762,277. Patented June 14, 1904.

UNITED STATES PATENT OFFICE.

CHARLES H. CAMPBELL, OF PHILADELPHIA, PENNSYLVANIA.

FOOD PRODUCT.

SPECIFICATION forming part of Letters Patent No. 762,277, dated June 14, 1904.

Application filed March 11, 1902. Serial No. 97,696. (No specimens.)

*To all whom it may concern:*

Be it known that I, CHARLES H. CAMPBELL, a citizen of the United States, residing in Philadelphia, in the county of Philadelphia and State of Pennsylvania, have invented a certain new and useful Improvement in Food Products, of which the following is a specification.

My invention aims to provide a new food product comprising a concentrated mixture of eggs and milk in such form that it can be transported with facility and can be stored for a much longer time than is possible with such mixtures at present.

My invention aims also to provide such a mixture in a desiccated condition and which is readily soluble in water to form a custard, such as is now in common use in pies or baked custards or the like.

My invention aims also to provide such a concentrated mixture in which by reason of the process employed the soluble and peptogenic qualities of the proteids are substantially undiminished as compared with the original milk and eggs used.

The preferred form in which my product is provided is that of a desiccated finely-ground product similar, except as to color, to flour or meal, the dissolving of such a product in water being most easy. The proportions of the ingredients may be varied within a considerable range, according to the product desired. A suitable proportion would be in the desiccated product one ounce of egg to two ounces of milk. The product may also include a small quantity of corn-starch or the like and sugar, salt, or flavorings, according to the taste desired.

My improved product may be obtained by any process which mixes and subsequently concentrates the eggs and milk. Preferably the milk is first partially concentrated—say to the consistency of ordinary condensed milk. The eggs are beaten, either the whites and yolks separately or together or only the whites or the yolks, and thoroughly mixed with the partially-concentrated milk, and the entire mixture further concentrated to any desired degree. Preferably the concentration is carried to the point of substantially complete desiccation, and the mixture is ground to a powder. Preferably, also, in order to avoid injury to the proteids the entire concentrating process is performed at a temperature below the coagulating-point of albumen, which preserves the soluble and peptogenic qualities of the proteids, the air-concentration processes described in Patents Nos. 668,161 and 668,162 of February 19, 1901, being preferably employed in order to hasten the process and prevent souring of the product. In adapting the processes of such patents to the production of my improved product I accomplish the first concentration of the milk by the process of Patent No. 668,161—that is to say, by maintaining the same at a desired temperature below the coagulating-point of albumen, so as to partially vaporize the milk, exposing it at the same time to a blast of air, preferably by blowing air into the milk in volume, depending upon the temperature applied and on the desired temperature of the milk. The blast of air carries off the heated vapor produced by the applied heat and maintains the milk at a temperature below that of the applied heat. This difference in temperature in turn hastens the process, the external heat being continually taken up by the milk and carried off with a portion of the vapor by the blast of air. If it is intended to produce a desiccated product, the milk should be skimmed in the beginning, so as to leave only non-fatty solids therein.

The milk concentrated to a desired point by the above-described process is then mixed with eggs, as stated, and the whole further concentrated or desiccated by substantially the process of Patent No. 668,162—that is to say, by exposing extended surfaces of the product and subjecting it simultaneously to the concentrating action of air in volume, depending upon the rapidity of action desired. The volume of air should be such as to reduce the mass to the desired degree of concentration or desiccation before souring, and preferably the air should be hot, but not so as to heat the product materially or for any considerable length of time above the coagulating-point of albumen. The exposure of the product to the air may be accomplished in the specific manner illustrated in said patent or by any other method or apparatus which operates in substantially the same way. When the mass becomes too thick for further treatment in this manner, it is broken up into small lumps and completely desiccated and ground.

A specific apparatus which may be used in the carrying out of the process is illustrated more or less diagrammatically in the accompanying drawings, in which—

Figure 2:
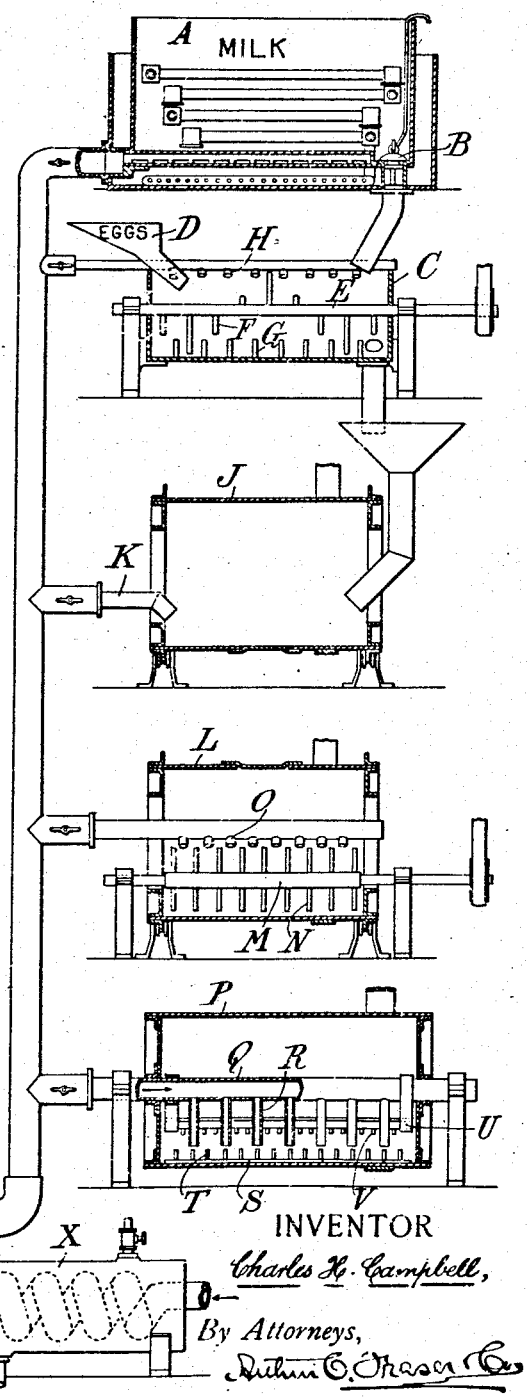

Figure 1 is a cross-section, and Fig. 2 a longitudinal section, showing in addition means for heating and blowing air.

In making my improved product with said apparatus the milk is first put into a concentrating-tank A, in which it is reduced to a desired degree of concentration in the manner explained. The valve B is then opened to let the milk out of the concentrating-tank A and into a mixer C, into which also the eggs are conducted from a hopper D. The shaft E is rotated, and its arms F stir and mix the product, being effectively assisted in this function by the pins G, which project inward from the wall of the vessel at points between the revolving arms F. The time spent in mixing the product in the mixer C may also be utilized in concentrating the same by providing a series of nozzles H at one side of the vessel, through which hot air is projected into the mass and upon the extended surfaces exposed by the rotating arms F, the mode of operation being substantially identical with that carried on in the next vessel. The mixing vessel C and the operations carried on therein may, however, be omitted entirely, a sufficient mixing of the product occurring in the hereinafter-described concentrating vessel and simultaneously with the concentration. Where the mixer C is used, however, the product is led therefrom into a drum J, into which hot air is projected through a nozzle K, the drum being slowly rotated, so as to expose an extended surface of the product to the desiccating action of the air in the manner described in Patent No. 668,162. The operation in this drum is continued until the mass coats the wall of the cylinder thickly and is of a doughy or putty-like consistency, so that the continuation of the operation would give but slow results. It is then broken into small lumps, being subdivided again and again in any suitable apparatus and simultaneously exposed to the desiccating action of air, preferably heated. An apparatus preferable for this purpose is shown at L, which is a drum substantially identical with the drum J and in which is a revolving shaft M, with a number of arms N, which break up and continually stir the material, while the rotation of the drum continually exposes a fresh surface of the material therein to the action of hot air blown thereon through a series of nozzles O. When the product has reached a certain degree of dryness and smallness of the lumps, the shaft M may be removed and the operation continued in the drum L, or the material may be returned to the drum J for further desiccation, in which it is desiccated to a degree sufficient for grinding, or the product may be conducted from the drum L to a drum P, which rotates about a hollow shaft Q, projecting from which are nozzles R, conducting hot air to the mass, now in the condition of small lumps or grains. As the cylinder revolves a cleat S, running lengthwise of the cylinder and carrying pins T, lifts the material up toward the side, after which it falls again to the bottom, the stirring and mixing of the same being assisted by a bar U, upon which are pins V, staggered in relation to the pins T, the bar U being attached to the stationary shaft Q.

W is a pressure-blower for supplying air to the several vessels, a heater being shown at X for supplying heated air and a branch at Y for the supply of cold air.

Though I have described in great detail a specific apparatus and process for the manufacture of my improved food product, yet it is to be understood that the invention is not limited to the specific apparatus and the process described. Various modifications of the same are possible to those skilled in the art without departure from the invention. It is understood, also, that the product may without departure from the invention be modified by the addition or substitution of ingredients known to those skilled in the art—such, for example, as sugar or flavorings or other suitable ingredients—and that the process is equally adapted to such modified compositions.

What I claim is—

1. The described food product, being a concentrated mixture of eggs and milk readily soluble in water.

2. The described food product, being a concentrated mixture of eggs and milk in which the soluble and peptogenic qualities of the proteids of the ingredients are substantially undiminished.

3. The described food product, being a concentrated mixture of eggs and the non-fatty matters of milk and being readily soluble in water.

4. The described food product, being a desiccated powdered mixture of eggs and milk readily soluble in water.

5. The described food product, being a desiccated powdered mixture of eggs and the non-fatty solids of milk, in which the soluble and peptogenic qualities of the ingredients are substantially undiminished.

In witness whereof I have hereunto signed my name in the presence of two subscribing witnesses.

CHARLES H. CAMPBELL.

Witnesses:
 GEORGE H. FRASER,
 DOMINGO A. USINA.